United States Patent [19]
Gaughan

[11] Patent Number: 5,730,504
[45] Date of Patent: Mar. 24, 1998

[54] RELEASE ASSURING ARRANGEMENT FOR COMBINED ELECTRO-PNEUMATIC/ AUTOMATIC PNEUMATIC BRAKE

[75] Inventor: Edward W. Gaughan, Greensburg, Pa.

[73] Assignee: Westinghouse Air Brake Company, Wilmerding, Pa.

[21] Appl. No.: 783,025

[22] Filed: Jan. 14, 1997

[51] Int. Cl.$^6$ ................................................ B60T 13/70
[52] U.S. Cl. ........................... 303/3; 303/86; 303/15; 303/29; 364/426.01
[58] Field of Search .......................... 303/3, 15, 86, 303/29, 9, 35, 44, 50, 54; 364/426.01; 188/352

[56] References Cited

U.S. PATENT DOCUMENTS

| | | | |
|---|---|---|---|
| 4,978,179 | 12/1990 | Balukin | 303/9 X |
| 5,393,129 | 2/1995 | Troiani et al. | 303/3 |
| 5,503,467 | 4/1996 | Gaughan | 303/128 X |

*Primary Examiner*—Josie Ballato
*Attorney, Agent, or Firm*—G. J. Falce

[57] ABSTRACT

An electro-pneumatic brake control system for a railroad freight car comprises application and release solenoid valves controlled by a microprocessor overlayed with the conventional car automatic pneumatic brake control system, including control for bleeding off auxiliary reservoir pressure at least during a power failure mode of operation during which the pneumatic brakes become effective to apply the car brakes in response to an induced brake pipe pressure reduction in the course of indirectly supplying brake pressure on cars having operable electro-pneumatic brakes. The bleed of auxiliary reservoir air pressure allows a subsequent slow recharge of the brake pipe pressure to create a positive release pressure differential across the control valve service piston to assure a brake release of the automatic pneumatic brake application to obviate a "stuck brake" condition on a car experiencing an electro-pneumatic power failure.

11 Claims, 2 Drawing Sheets

| SOLENOID VALVE | 22 | 24 | 40 | 41 |
|---|---|---|---|---|
| CHARGE/RELEASE | D | E | E | E |
| APPLICATION | E | D | E | E |
| LAP | D | D | E | E |
| E/P FAILURE | D | D | D | D |

RELEASE ASSURING ARRANGEMENT FOR COMBINED ELECTRO-PNEUMATIC/ AUTOMATIC PNEUMATIC BRAKE

BACKGROUND OF THE INVENTION

This invention relates to a brake control system for railroad freight cars and in particular to such a brake control system that integrates electro-pneumatic control of the brake with the conventional automatic pneumatic brake control.

From the inception of the early Westinghouse air brake, until the present time, compressed air has been employed as the medium by which brake control signals have been transmitted through a train of railroad freight cars, as well as the force by which friction retardation is applied through brake shoes that engage the car wheel treads during braking. As the size of freight cars has increased to provide greater load carrying capacity, and the number of cars capable of being hauled in a train has likewise grown, there have been continued improvements in the air brake system to make it more efficient, in order to provide better stopping ability consistent with the greater demands placed on the air brake system.

Electro-pneumatic brake control systems are known to extend the capability of the air brake beyond that which is achieved with the conventional automatic pneumatic brake control system presently employed. These improved capabilities are possible due primarily to the fact that the brake control signal can be transmitted almost instantaneously to each car in the train, whereas propagation of a pneumatic control signal through a train of cars is limited to a value approaching the speed of sound. By instantaneously transmitting a brake control signal to each car of a train, not only is the time required to initiate braking action on all of the cars reduced, but in-train forces, due to sequential brake buildup times among the cars, are better controlled. This permits greater brake force to be employed to achieve shorter stop distances without incurring damage to car lading and couplers.

The present automatic pneumatic brake control system is fail-safe in the sense that a train break-in-two will result in an emergency brake application on both halves of the separated train without any initiative on the part of the locomotive engineer. Electro-pneumatic brakes also offer the possibility of fail-safe operation. By appropriately configuring the solenoid valves in the brake cylinder and exhaust piping, brake pressure can be obtained in a de-energized state. A fail-safe application of the electro-pneumatic brakes may not be desirable, however, where loss of power to the solenoid valves results not from a train break-in-two, but from an electrical malfunction on an individual car, since the brakes on such an individual car would be applied while the train continued to run. This could lead to thermal wheel damage, prematurely worn brake shoes, burned brake heads and possible wheel fracture.

For this reason, and in order to utilize the pneumatic control valve and associated equipment which already exists on present-day freight cars, the electro-pneumatic brake is contemplated as an overlay with the existing pneumatic brake. In one such arrangement, the brake pipe is charged and maintained at a desired running pressure of the train during electro-pneumatic operation. As is well known, the pneumatic control valve assumes a release condition as a result of the brake pipe being so charged, the intent being to hold the pneumatic brake in abeyance to provide an automatic emergency brake during a train break-in-two, and for providing a back-up service and/or emergency brake when desired to operate under pneumatic control. In this sense, the need to configure the solenoid valves for fail-safe operation is obviated, thus overcoming the above-discussed disadvantages such fail-safe configuration creates.

Such electro-pneumatic overlay arrangements are not without shortcomings, however. During electro-pneumatic operation, for example, the brake cylinder pressure is supplied from the auxiliary or emergency reservoir associated with the pneumatic brake control equipment and thus ultimately from the brake pipe, which is the source of reservoir supply air. This demand on brake pipe supply induces a reduction of pressure along the train brake pipe, since the capacity and resistance of fluid flow in the brake pipe generally inhibits its ability to be maintained throughout the train during electro-pneumatic braking at the desired running pressure to which it was initially charged.

On cars having an active or operable electro-pneumatic brake, such an induced reduction in brake pipe pressure is inconsequential, since the auxiliary reservoir becomes either a direct source of air supplied to the brake cylinder or an indirect source when the emergency reservoir is used as the direct source. Thus, an auxiliary reservoir pressure reduction at least as great as the induced brake pipe pressure reduction occurs, so that the release differential across the pneumatic control valve service piston remains intact and the service piston is accordingly stabilized in release position.

In the event, however, that the electro-pneumatic brake on any given car becomes inoperable due, for example, to an electrical malfunction, no pressure is supplied from either the auxiliary or emergency reservoir to the brake cylinder on that particular car. Therefore, an induced brake pipe pressure reduction is not counteracted by an auxiliary reservoir pressure reduction on the car experiencing an inoperable electro-pneumatic brake. This results in a brake pipe/auxiliary reservoir pressure differential occurring across the pneumatic control valve service piston which may be sufficient to force the service piston to application position. Such occurrence results in a pneumatic brake application on a car or cars having inoperable electro-pneumatic brakes, which is, in itself, not a problem, but may present a problem in that such a brake application could result in a "stuck brake" condition when the electro-pneumatic brakes are released.

It will be understood that various factors including the brake pipe running pressure, brake pipe length, location of an inoperable car in the train, the degree of brake application, the brake pipe charging pressure head, and brake pipe leakage all influence the ability of the brake pipe pressure to re-charge fast enough following an induced reduction of brake pipe pressure to reverse the application differential across the service piston. In such event, a release differential sufficient to force the service piston to release position may not be attainable and the afore-mentioned "stuck brake" condition will prevail.

SUMMARY OF THE INVENTION

The object of the present invention is to provide a reliable, simple, and low-cost way to assure the release of a brake application in the event the pneumatic control valve of a railroad car having an inoperable electro-pneumatic brake applies the car brakes in response to an induced reduction of brake pipe pressure during electro-pneumatic brake operation.

In fulfilling this objective, there is provided a solenoid-operated bleed valve via which auxiliary reservoir air is vented to atmosphere via a choke. Auxiliary reservoir pressure acting on one side of the brake control valve service piston is thus reduced sufficiently that an increase in brake pipe pressure effective on the other side of the service piston following a relatively small reduction of brake pipe pressure induced by electro-pneumatic brake operation will be assured of establishing a release pressure differential across the service piston sufficient to force the piston to release position and accordingly prevent the occurrence of a stuck brake.

BRIEF DESCRIPTION OF THE DRAWINGS

This and other attendant objects and advantages of the present invention will become apparent from the following more detailed explanation when taken in conjunction with the accompanying drawings in which.

DESCRIPTION AND OPERATION

Figure 1:
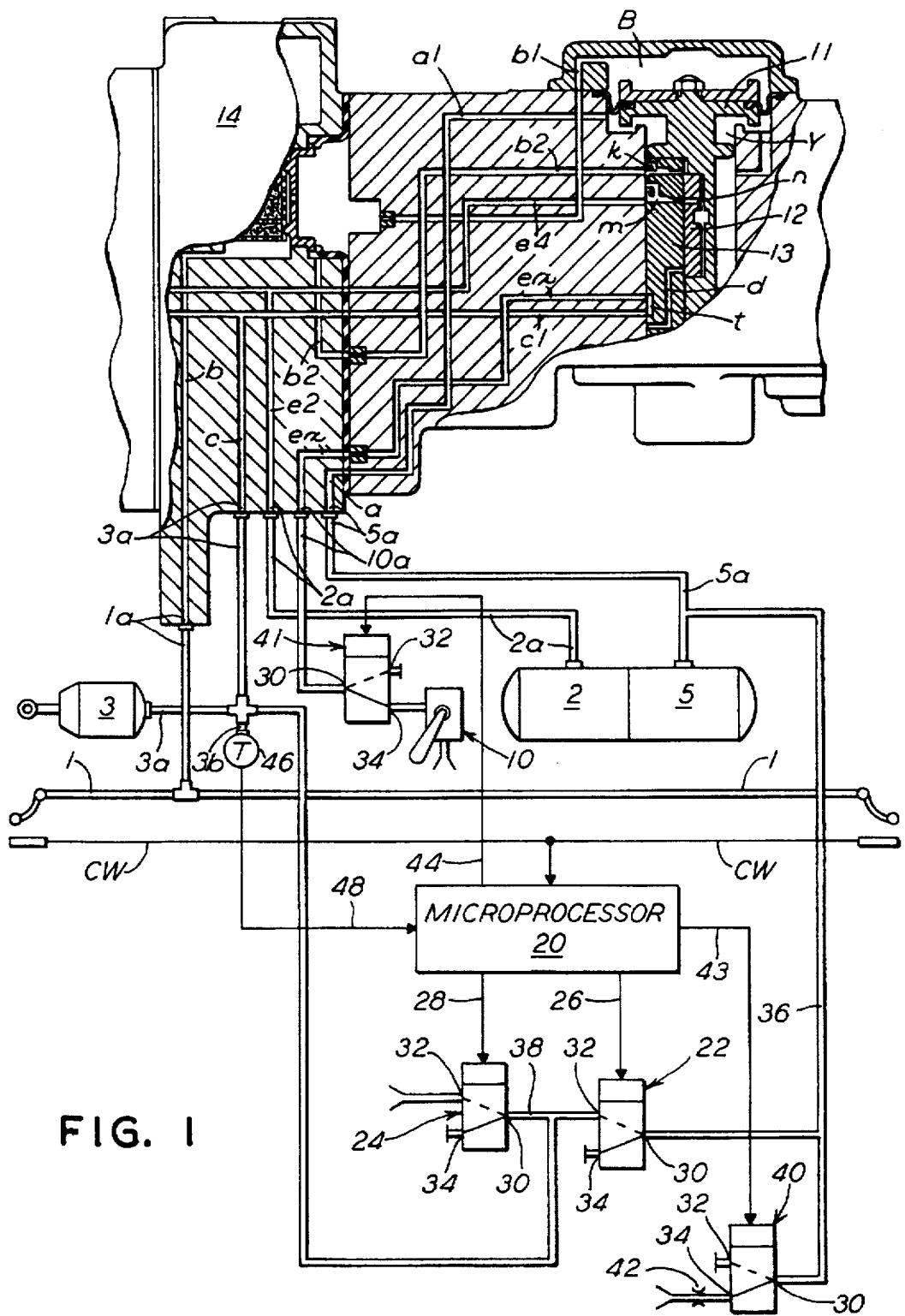
FIG. 1 is a diagrammatic view of an integrated automatic pneumatic/electro-pneumatic brake system incorporating the brake release assurance feature of the present invention, with the pneumatic control valve being shown in its charging position.

Referring to FIG. 1 of the drawing, there is shown a railroad freight car brake system having a conventional ABD, ABDW or ABDX type brake control valve device 14. Typically, such railroad freight car brake systems include, in addition to control valve device 14, a brake pipe 1, a brake cylinder 3, an emergency reservoir 2, an auxiliary reservoir 5, and a retainer valve 10. The ends of brake pipe 1 are provided with flexible hose and couplings for connecting with the counterpart hose and couplings on adjacent ends of an adjoining freight car in a railroad train. As is well known, brake pipe 1 is charged with compressed air stored in the main reservoirs on the locomotive of the afore-mentioned railroad train, the pressure in brake pipe 1 being maintained at a predetermined running pressure when the locomotive brake valve (not shown) is set in release position.

As is also well known, control valve device 14 assumes a release and charging position, as shown, in response to the pressure in brake pipe 1 being increased, such as when charging the system and when releasing a previous brake application. In this release and charging position of control valve device 14, compressed air is connected from brake pipe 1 to auxiliary reservoir 5 via branch pipe and port 1a, passage b, passage b2, a passage k in slide valve 13 of the service piston 11, a chamber Y under the service piston diaphragm, passage a1, passage a, and supply port and pipe 5a. In turn, compressed air is also connected from chamber Y to the emergency reservoir 2 via passage n in the service piston graduating valve 12, a passage m in slide valve 13, passages e4, e2, and supply port and pipe 2a. Concurrently with the afore-mentioned charging, brake cylinder device 3 is vented to atmosphere via pipe and delivery port 3a, passages c, c1, slot t in slide valve 13, passage ex, and exhaust port and pipe 10a.

Being conventional, the foregoing pneumatic brake control system is capable of providing service and emergency brake applications in accordance with a reduction in brake pipe pressure at appropriate rates in a well-known manner.

Integrated with the above-explained pneumatic brake control system is an electro-pneumatic brake control system including a microprocessor unit 20, an application valve 22 and a release valve 24. In an exemplary application of the present invention, these valves 22, 24 are assumed to be solenoid-operated, spring-returned, 2-way, pneumatic valves, the respective solenoid operators being connected by wires 26, 28 to microprocessor unit 20. Each solenoid valve has an inlet 30 and a pair of outlets 32 and 34. Inlet 30 of solenoid application valve 22 is connected to auxiliary reservoir 5 via pipe 36 and outlet 32 is connected to inlet 30 of solenoid release valve 24 via pipe 38. Outlet 32 of release solenoid valve 24 is vented to atmosphere, while the respective valve outlets 34 are blanked. Pipe 38 is connected to brake cylinder 3 via a branch pipe 39 and pipe 3a.

The electro-pneumatic brake control system also includes a solenoid-operated, spring-returned, two-way bleed valve 40 and cut-off valve 41, each having an inlet 30 and outlets 32, 34. Inlet 30 of bleed valve 40 is connected to auxiliary reservoir 5 via pipe 36 in parallel with inlet 30 of application valve 22 and outlet 34 is vented to atmosphere via a choke 42. Inlet 30 of cut-off valve 41 is connected to exhaust pipe 10a and outlet 34 is connected to retainer valve 10, which, for purposes of the present invention, should be considered to be in its direct release position. Outlets 34 of the respective bleed valve and cut-off valve are blanked, while their solenoid operators are connected by respective wires 43, 44 to microprocessor unit 20.

Electrical power for the microprocessor unit 20 and the solenoid operators of the respective magnet valves may be provided by an on-car battery (not shown), while a control wire CW that is interconnected by suitable connectors to a corresponding control wire of an adjoining car (not shown) forms a train line to conduct brake control signals from the locomotive to microprocessor unit 20 on each car. A viable alternative choice to a hardwire communication link is radio signals. Connected via a pipe 3b to brake cylinder pipe 3a is a pressure transducer 46 that provides feedback information corresponding to the instantaneous brake cylinder pressure to the microprocessor unit via wire 48.

Figures 2, 3:
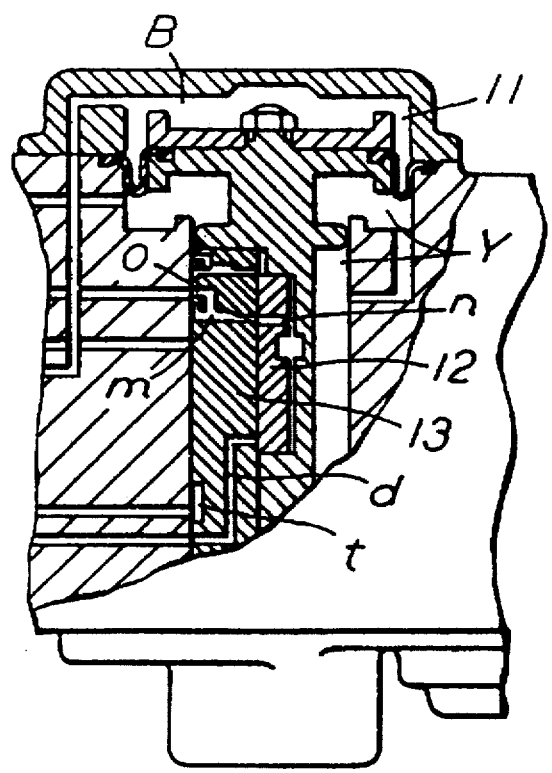
FIG. 2 is a chart showing the status of the various solenoid valves employed with the electro-pneumatic brake for different brake control functions.
FIG. 3 is a partial diagrammatic view of the pneumatic brake control valve of FIG. 1 shown in its service lap position.

Under normal electro-pneumatic operation, the brake cylinder pressure is under control of the solenoid valves 22, 24, application valve 22 being in a de-energized condition and release valve 24 being in an energized condition during the above-explained charging of the pneumatic brake system, as can be seen from the chart of FIG. 2. This accommodates venting of brake cylinder 3 during charging of the pneumatic brake system via the vented outlet 32 of release solenoid valve 24, such venting of brake cylinder pressure via retainer valve 10 being interrupted by cut-off valve 41 in its energized condition in which it is maintained except during a power failure, as shown in the chart of FIG. 2. Since control valve device 14 is in release and charging position, as shown and described in response to charging of brake pipe 1, slide valve 13 is positioned by service piston 11 such that slot t connects passages ex and c1 to establish an exhaust path through control valve device 14.

When an electro-pneumatic brake application is desired, a control signal is conducted over wire 44, which is evaluated by microprocessor unit 20 in terms of the brake cylinder pressure feedback signal received via wire 48. Since brake cylinder pressure is exhausted due to the venting thereof during charging, as above-mentioned, a difference exists between the control and feedback signals indicative of the desired level of brake application. Microprocessor unit 20 responds to this signal difference to energize solenoid valve 22 and de-energize solenoid valve 24, as shown in the chart of FIG. 2 for an application condition. Inlet port 30 of application solenoid valve 22 is thus connected to outlet port 32 to establish fluid pressure communication between auxiliary reservoir 5 and brake cylinder 3 via pipe 36, open solenoid valve 22, pipes 38, 40 and pipe 3a.

When brake cylinder pressure, as reflected by transducer 46, provides a feedback signal to microprocessor 20 corresponding to the desired brake application according to the signal at control wire CW, application solenoid valve 22 will become de-energized via wire 26, while release solenoid valve 24 remains de-energized as shown in the chart of FIG. 2 for a lap condition. At solenoid valve 22, inlet port 30 is disconnected from outlet port 32 and is connected to blanked outlet port 34, thus interrupting further supply of auxiliary reservoir pressure to brake cylinder 3. Should brake cylinder pressure leak off, so as to fall below a level corresponding to the desired brake application, microprocessor 20 will energize application solenoid valve 22 to re-establish the auxiliary reservoir supply path to brake cylinder 3. In this manner, the desired brake cylinder pressure is maintained until a further increase or decrease in the brake application is desired.

During this brake application cycle, solenoid bleed valve 40 and solenoid cut-off valve 41 are energized, as indicated in the chart of FIG. 2. In their energized state, both valves are closed to prevent auxiliary reservoir pressure from bleeding off to atmosphere via choke 42, and to prevent brake cylinder pressure from escaping to atmosphere via retainer valve 10.

The brake cylinder pressure may be released either directly or in graduated increments by reducing the control wire signal accordingly. When the control wire signal is less than the feedback signal, microprocessor unit 20 operates to de-energize application solenoid valve 22 and to energize release solenoid valve 24. In the de-energized condition of solenoid valve 22, as previously explained, during charging of brake pipe 1, the auxiliary reservoir pressure is cut off from brake cylinder 3. In the energized condition of release valve 24, brake cylinder pressure is released to atmosphere via outlet 32.

As previously discussed, and in consequence of auxiliary reservoir air being supplied to the brake cylinder during such electro-pneumatic operation, an induced reduction of brake pipe pressure can be expected to occur. On those cars having operable electro-pneumatic braking, this induced reduction of brake pipe pressure effective in chamber B above service piston 11 is offset by the reduction of auxiliary reservoir pressure in chamber Y on the opposite side of service piston 11, such auxiliary reservoir pressure reduction resulting from the supply of auxiliary reservoir air to brake cylinder 3 during an electro-pneumatic brake application. Thus, the release differential across service piston 11 is sustained and service piston 11 is stabilized in release position on cars having operable electro-pneumatic brakes.

On the other hand, no significant reduction of auxiliary reservoir pressure occurs on those cars having inoperable electro-pneumatic brakes, due to a power failure, for example, since application solenoid valve 22 assumes its normally closed position cutting off the supply of auxiliary reservoir air to brake cylinder 3, as indicated in the chart of FIG. 2. Accordingly, the induced reduction of brake pipe pressure effective in chamber B above service piston 11 without a corresponding reduction in chamber Y results in a service differential being established across piston 11 to force the service piston to application position. This results in the auxiliary reservoir air being supplied to brake cylinder 3 via pneumatic control valve device 14, in a manner well known to those skilled in the railroad braking art. The resultant automatic pneumatic brake application has no adverse effect in terms of applying the car brakes, and, in fact, may be desirable from the standpoint of providing back-up braking on a car experiencing an electro-pneumatic failure. However, experience has shown that a brake application resulting from an abnormally light reduction of brake pipe pressure may not release. Similarly, if a pneumatic service brake is applied and the subsequent recharge of brake pipe pressure occurs at a very slow rate, the valve may not release. This possibility, combined with the fact that the release solenoid valve 24 closes during a power failure, can cause a "stuck brake condition" to exist.

The present invention addresses this potential problem by providing solenoid bleed valve 40, which is maintained in an energized state except when microprocessor 20 detects a malfunction or failure of the electro-pneumatic brake control system, as shown in the chart of FIG. 2. In response to such an electro-pneumatic failure, wire 43 is de-energized by microprocessor 20 to establish a de-energized condition of solenoid bleed valve 40. Auxiliary reservoir air is accordingly released to atmosphere at a restricted rate via pipe 36, inlet 30, outlet 34 and choke 42. This reduces auxiliary reservoir pressure effective in chamber Y under the service piston 11 sufficiently to assure that a release differential is established in consequence of the normal recharging of brake pipe pressure following the afore-mentioned induced reduction that typically occurs as a consequence of electro-pneumatic brake operation. This release differential effective across service piston 11 forces the service piston from application position to release position. Accordingly, the automatic pneumatic brake application provided by control valve device 14 is released by venting brake cylinder pressure to atmosphere at retainer valve 10 in a manner well known to those skilled in the railroad braking art.

As shown in the chart of FIG. 2, cut-out solenoid valve 41 is maintained in an energized state except when microprocessor 20 detects a malfunction or failure of the electro-pneumatic brake control system. In response to such an electro-pneumatic failure, wire 44 is de-energized by microprocessor 20 to establish a de-energized condition of cut-out valve 41, in which condition inlet 30 is connected to outlet 34 to accommodate the venting of brake cylinder pressure to atmosphere at retainer valve 10.

As is well known to those skilled in the railroad braking art, a so-called "sweeper" port O is provided in slide valve 13 of service piston 11 of all ABD, ABDW and ABDX type freight brake control valves 14. This weeper port O is a very small restriction via which brake pipe passage 62 is communicated with auxiliary reservoir 5 in lap position of service piston 11, as shown in FIG. 3, the purpose being to stabilize piston 11 in lap position against such undesired fluctuations in auxiliary reservoir pressure, as would otherwise cause an inadvertent release of the brakes. The size of choke 42 associated with bleed valve 40, therefore, is selected to have a greater flow capacity than the flow capacity of weeper port O, in order to achieve a greater outflow of auxiliary reservoir air to atmosphere than the counteracting inflow of air to the auxiliary reservoir from brake pipe passage 62. Bleed choke 42 may be sized such that a slow recharging of brake pipe pressure is required to achieve sufficient pressure differential to cause a release, or it may be sized such that a slow reduction of auxiliary reservoir pressure will bring about a release even if the brake pipe pressure is simply maintained at the given application pressure and not increased. In this manner, a stuck brake condition, as previously discussed, can be prevented, notwithstanding the counteracting effect of the existing weeper port function in existing pneumatic brake control valves.

It is further to be understood that the control of the opening of solenoid bleed valve 40 may alternately be dependent upon energization of said valve by an electronic backup circuit rather than de-energization as described in the illustrated embodiment.

I claim:

1. An electro-pneumatic brake system for a railroad car having a brake pipe normally charged to a predetermined running pressure and means for receiving an electrical signal corresponding to a desired brake control function comprising:
   (a) a brake cylinder device;
   (b) a reservoir charged with fluid under pressure from said brake pipe;
   (c) a pneumatic brake control valve device comprising piston valve means for establishing fluid pressure communication between said reservoir and said brake cylinder device in response to a preponderance of pressure in said reservoir relative to said brake pipe and for releasing fluid under pressure from said brake cylinder device in response to a preponderance of fluid pressure in said brake pipe relative to said reservoir;
   (d) electro-pneumatic means for receiving an electric brake control signal comprising:
      (i) means for processing said electric brake control signal; and
      (ii) electrically operated valve means for establishing fluid pressure communication between said reservoir and said brake cylinder device in response to said processor means providing a brake application signal, and for releasing fluid under pressure from said brake cylinder device in response to said processor means providing a brake release signal; and
   (e) bleed means for venting said reservoir to atmosphere.

2. A brake system as recited in claim 1, wherein said bleed means includes a bleed choke via which fluid under pressure is released from said reservoir to atmosphere.

3. A brake system as recited in claim 2, wherein said piston valve means has a lap position for interrupting said fluid pressure communication between said reservoir and said brake cylinder device and for concurrently interrupting said release of fluid under pressure from said brake cylinder device, said pneumatic brake control valve further comprising a weeper choke via which said auxiliary reservoir is connected with said brake pipe in said lap position of said piston valve means.

4. A brake system as recited in claim 3, wherein the flow capacity of said bleed choke to atmosphere is greater than the flow capacity of said weeper choke when connecting said reservoir pressure to said brake pipe pressure.

5. A brake system as recited in claim 3, wherein said electro-pneumatic means further comprises:
   (a) means for detecting an inoperable condition of said processor means; and
   (b) said venting means including valve means for interrupting said venting of said reservoir except in response to operation of said detecting means.

6. A brake system as recited in claim 5, wherein said valve means is a two-position, normally open, solenoid-operated valve having an inlet connected to said reservoir and an outlet open to atmosphere.

7. A brake system as recited in claim 6, wherein said solenoid-operated valve assumes said normally open position in a de-energized condition thereof.

8. A brake system as recited in claim 1, wherein said electro-pneumatic means further comprises:
   (a) means for detecting an inoperable condition of said electro-pneumatic means; and
   (b) said bleed means including valve means for interrupting said venting of said reservoir except in response to operation of said detecting means.

9. A brake system as recited in claim 8, wherein said valve means is a two-position, normally open, solenoid-operated valve having an inlet connected to said reservoir and an outlet open to atmosphere.

10. A brake system as recited in claim 9, wherein said bleed means includes a bleed choke between said reservoir and atmosphere via which fluid under pressure is released from said reservoir in said normally open condition of said solenoid-operated valve.

11. A brake system as recited in claim 10, wherein said solenoid-operated valve assumes said normally open position in a de-energized condition thereof.

* * * * *